US011472501B2

(12) United States Patent
Jin et al.

(10) Patent No.: US 11,472,501 B2
(45) Date of Patent: Oct. 18, 2022

(54) JIG APPARATUS FOR ASSEMBLING TRUNK LID

(71) Applicants: Hyundai Motor Company, Seoul (KR); Kia Motors Corporation, Seoul (KR)

(72) Inventors: Taeheun Jin, Gyeongsangbuk-do (KR); Minsun Sim, Incheon (KR); Yunheui Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 437 days.

(21) Appl. No.: 16/577,593

(22) Filed: Sep. 20, 2019

(65) Prior Publication Data

US 2020/0094897 A1   Mar. 26, 2020

(30) Foreign Application Priority Data

Sep. 21, 2018  (KR) ........................ 10-2018-0114067

(51) Int. Cl.
*B62D 65/02* (2006.01)
*B62D 65/06* (2006.01)
(Continued)

(52) U.S. Cl.
CPC ............ *B62D 65/026* (2013.01); *B23K 3/087* (2013.01); *B23K 37/0443* (2013.01); *B62D 65/06* (2013.01); *B23K 1/0056* (2013.01); *B23K 37/04* (2013.01); *B23K 37/0408* (2013.01); *B23K 37/0452* (2013.01); *B23K 37/0461* (2013.01);
(Continued)

(58) Field of Classification Search
CPC .... B62D 65/026; B62D 65/06; B23K 1/0056; B23K 3/087; B23K 1/0008; B23K 37/04; B23K 37/0443; B23K 37/0408; B23K 37/0452; Y10T 29/49899; Y10T 29/49902;
(Continued)

(56) References Cited

U.S. PATENT DOCUMENTS 8,905,390 B2 * 12/2014 Yeum ................. B23K 37/0443
                                                           269/58
9,827,630 B2 * 11/2017 Yeum ................. B23K 37/0443
(Continued)

FOREIGN PATENT DOCUMENTS

CA         3031596 A1 *  2/2018  ......... B23K 35/0261
WO   WO-2015156354 A1 * 10/2015  ........... B23K 11/115

OTHER PUBLICATIONS

Lee et al., Assembly device for assembling rear combination lamp mounting structure for vehicle, comprises jig frame which is installed to be reciprocally movable forward and backward along guide rail, and comprises first alignment, Translation of abstract and brief description, pp. 1-5 (Year: 2018).*

*Primary Examiner* — Jermie E Cozart
(74) *Attorney, Agent, or Firm* — Fox Rothschild LLP

(57) ABSTRACT

A jig apparatus is used for assembling a trunk lid including an upper panel, an extension panel, and a lower panel. The jig apparatus may include: a jig frame; a first activation jig unit configured to align and fix the upper panel and the extension panel and installed at the jig frame in front and rear directions to be tilting-rotatable; and a second activation jig unit aligning and fixing the lower panel and installed at the jig frame to be linearly movable in the front and rear directions with respect to the first activation jig unit.

20 Claims, 16 Drawing Sheets

(51) Int. Cl.
  *B23K 37/04*   (2006.01)
  *B23K 3/08*    (2006.01)
  B23K 1/005    (2006.01)
  B25B 11/02    (2006.01)
  B23Q 3/06     (2006.01)
  B23Q 3/04     (2006.01)

(52) U.S. Cl.
  CPC ............... *B23Q 3/04* (2013.01); *B23Q 3/061* (2013.01); *B25B 11/02* (2013.01); *Y10T 29/49899* (2015.01); *Y10T 29/49902* (2015.01); *Y10T 29/49904* (2015.01)

(58) Field of Classification Search
  CPC ..... Y10T 29/49904; B25B 11/02; B23Q 3/04; B23Q 3/061
  USPC .................................................. 228/4.1, 6.1
  See application file for complete search history.

(56) References Cited

U.S. PATENT DOCUMENTS

| | | | |
|---|---|---|---|
| 10,646,979 B1* | 5/2020 | Schiveley | B25B 11/02 |
| 2002/0157920 A1* | 10/2002 | Gattrell | B23Q 1/5468 |
| | | | 198/375 |
| 2008/0003087 A1* | 1/2008 | Geiss | B23P 19/04 |
| | | | 414/431 |
| 2015/0144601 A1* | 5/2015 | Yeum | B23K 37/0443 |
| | | | 219/86.24 |
| 2016/0068208 A1* | 3/2016 | Sakamoto | B23K 37/0443 |
| | | | 269/280 |

* cited by examiner (a)

(b)

(a)

(b)

JIG APPARATUS FOR ASSEMBLING TRUNK LID

CROSS-REFERENCE TO RELATED APPLICATION

This application claims under 35 U.S.C. § 119(a) the benefit of Korean Patent Application No. 10-2018-0114067 filed in the Korean Intellectual Property Office on Sep. 21, 2018, the entire contents of which are incorporated herein by reference.

BACKGROUND

(a) Technical Field

The present disclosure relates to a vehicle body part assembly system, more particularly, to a jig apparatus for assembling a trunk lid as a mounting part to be mounted to a vehicle body.

(b) Description of the Related Art

Generally, in a vehicle body assembly process, moving parts such as a door, a hood, a trunk lid, and a tail gate are mounted at predetermined positions of a vehicle body. These moving parts are fabricated through an assembly process of panels molded by a press process, etc. In this assembly process, the panels are welded in a state in which the panels are fixed to a jig apparatus.

For example, the trunk lid typically includes an upper panel, a lower panel, and an extension panel between these upper and lower panels. The extension panel is installed at a bent part between the upper panel and the lower panel, and the extension panel is equipped with a license plate lamp, a trunk opening/closing handle, and a rear camera.

In the conventional art, the trunk lid as described above is assembled in a process in which the upper panel, the lower panel, and the extension panel are bonded by spot welding, and a plastic back panel molding is mounted to the lower panel.

However, in the conventional art, the application of the plastic back panel molding increases the weight and material cost, and it is difficult to realize an attractive design. Therefore, research has been conducted on trunk lid assembling technology which may reduce the weight and the cost and improve the design freedom by eliminating the plastic back panel molding.

On the other hand, in the conventional art, the trunk lid is assembled through a process in which the upper panel and the extension panel are fixed to a jig and then welded, and in a state in which the primary welded part and the lower panel are fixed to another jig, the extension panel and the lower panel are welded.

However, in the conventional art, the entire assembly process is complicated, and additional assembly time and handling cycle time are required for aligning and fixing the panels to different process jigs.

Also, in the conventional art, as the panels are aligned, fixed, and welded in different process jigs, diminished assembly quality of the panels and the trunk lid and poor centering of the panels may occur.

The above information disclosed in this Background section is only for enhancement of understanding of the background of the disclosure and therefore it may contain information that does not form the prior art that is already known in this country to a person of ordinary skill in the art.

SUMMARY

Exemplary embodiments of the present disclosure provide a jig apparatus for assembling a trunk lid for aligning and fixing an upper panel, an extension panel, and a lower panel in a single process and welding these panels through laser brazing.

A jig apparatus for assembling a vehicle trunk lid according to an exemplary embodiment of the present disclosure including an upper panel, an extension panel, and a lower panel may include: a jig frame; a first activation jig unit configured to align and fix the upper panel and the extension panel and installed at the jig frame in front and rear directions to be tilting-rotatable; and a second activation jig unit configured to align and fix the lower panel and installed at the jig frame to be linearly movable in front and rear directions with respect to the first activation jig unit.

Further, in the jig apparatus for assembling the trunk lid according to an exemplary embodiment of the present disclosure, the first activation jig unit may align and fix the upper panel and the extension panel so that a lower end edge of the upper panel and a first side edge of the extension panel are mutually overlapped.

In the jig apparatus for assembling the trunk lid according to an exemplary embodiment of the present disclosure, the first activation jig unit may align and fix the upper panel and the extension panel so that the lower end edge of the upper panel and the first side edge of the extension panel are mutually overlapped.

In the jig apparatus for assembling the trunk lid according to an exemplary embodiment of the present disclosure, in a state in which the first activation jig unit is tilting-rotated in a direction away from the second activation jig unit, the upper panel and the extension panel may be aligned and fixed.

In the jig apparatus for assembling the trunk lid according to an exemplary embodiment of the present disclosure, the second activation jig unit may align and fix the lower panel so that the lower panel faces a second side edge of the extension panel, and in a state in which the first activation jig unit is tilting-rotated in a direction approaching the second activation jig unit, the second activation jig unit may be linearly moved in the first activation jig unit side and may press the lower panel to the second side edge of the extension panel.

In the jig apparatus for assembling the trunk lid according to an exemplary embodiment of the present disclosure, in the first activation jig unit, primary laser brazing may be performed for an overlapping part of the upper panel and the extension panel through a brazing assembly.

In the jig apparatus for assembling the trunk lid according to an exemplary embodiment of the present disclosure, secondary laser brazing may be performed between the first and second activation jig units through the brazing assembly for a facing part of the lower panel and the extension panel.

A jig apparatus for assembling an upper panel, an extension panel, and a lower panel of a vehicle trunk lid by laser brazing includes: a jig frame; a first activation frame having a first jig base supporting the upper panel and the extension panel and installed at the jig frame in front and rear directions to be tilting-rotatable; a second activation frame having a second jig base supporting the lower panel and installed corresponding to the first activation frame at the jig frame to be linearly movable in front and rear directions; a plurality of aligning units respectively installed at the first and second activation frames, aligning the upper panel and the extension panel in a predetermined position of the first jig base, and aligning the lower panel in a predetermined position of the second jig base; and a plurality of clampers respectively installed at the first and second activation frames, fixing the upper panel and the extension panel at the first jig base, and fixing the lower panel at the second jig base.

The jig apparatus for assembling the trunk lid according to an exemplary embodiment of the present disclosure may further include a first driving cylinder installed at both of right and left sides of the jig frame to be connected to the first activation frame and tilting-rotating the first activation frame in the front and rear directions.

In the jig apparatus for assembling the trunk lid according to an exemplary embodiment of the present disclosure, the first activation frame may be coupled to the jig frame through a tilting rotation axis to be tilting-rotatable.

In the jig apparatus for assembling the trunk lid according to an exemplary embodiment of the present disclosure, the first driving cylinder may be connected to both ends of the tilting rotation axis through the rotation bracket and apply a forward/backward activation force in front and rear directions to the rotation bracket through an actuating rod.

In the jig apparatus for assembling the trunk lid according to an exemplary embodiment of the present disclosure, the second activation frame may be installed in the fixing frame on the jig frame to be movable back and forth in the front and rear directions through a guide rail.

In the jig apparatus for assembling the trunk lid according to an exemplary embodiment of the present disclosure, a second driving cylinder connected to the second activation frame and applying a forward/backward activation force to the second activation frame in front and rear directions may be installed at both of right and left sides of the fixing frame.

The jig apparatus for assembling the trunk lid an exemplary embodiment of the present disclosure may further include a locking unit installed at the fixing frame and selectively locking the first activation frame to the fixing frame.

In the jig apparatus for assembling the trunk lid according to an exemplary embodiment of the present disclosure, the locking unit may be hinge-coupled to a locking cylinder installed at the fixing frame and an actuating rod tip of the locking cylinder, and may include a locking block installed at the fixing frame to be rotatable.

In the jig apparatus for assembling the trunk lid according to an exemplary embodiment of the present disclosure, a docking block through which locking and unlocking is selectively performed with the locking block may be installed at the first activation frame.

In the jig apparatus for assembling the trunk lid according to an exemplary embodiment of the present disclosure, the aligning units may include: a first aligning unit installed at the first activation frame and aligned so that a lower end edge of the upper panel overlaps a first side edge of the extension panel; and a second aligning unit installed at the second activation frame and aligned so that the lower panel faces a second side edge of the extension panel.

In the jig apparatus for assembling the trunk lid according to an exemplary embodiment of the present disclosure, the clampers may include: a first clamper installed at the first activation frame and respectively clamping the upper panel and the extension panel; and a second clamper installed at the second activation frame and clamping the lower panel.

In the jig apparatus for assembling the trunk lid according to an exemplary embodiment of the present disclosure, the first jig base may be installed at the first activation frame along right and left directions and provided with a block shape supporting the bent part of the upper panel and the extension panel.

In the jig apparatus for assembling the trunk lid according to an exemplary embodiment of the present disclosure, the first aligning unit may include: a plurality of first alignment locators installed at the first activation frame and supporting a flat part of the upper panel; and at least one position determining pin installed at the first activation frame, installed to be movable in up and down directions through the first jig base by a pin cylinder, and inserted into a reference hole provided in the extension panel.

In the jig apparatus for assembling the trunk lid according to an exemplary embodiment of the present disclosure, the second base jig may be installed at the second activation frame along the right and left directions to be inclined toward the first activation frame and provided as a plate type supporting the lower panel.

In the jig apparatus for assembling the trunk lid according to an exemplary embodiment of the present disclosure, the second aligning unit may include: a plurality of second alignment locators installed at the second activation frame and supporting a flat part of the lower panel; and at least one third alignment locator installed at the second activation frame to be movable by the first locator cylinder in the up and down directions and supporting an edge bent part of the lower panel.

In the jig apparatus for assembling the trunk lid according to an exemplary embodiment of the present disclosure, the second aligning unit may further include a fourth alignment locator disposed corresponding to the second jig base at the second activation frame to be inclined toward the first activation frame, installed to be movable by a second locator cylinder in the up and down directions, and supporting both end bent parts of the lower panel.

In the jig apparatus for assembling the trunk lid according to an exemplary embodiment of the present disclosure, the fourth alignment locator may include: a first locator block forming a same flat surface as both end parts of the second jig base; and a second locator block connected to the first locator block and forming an end step for supporting both end bent parts of the lower panel.

In the jig apparatus for assembling the trunk lid according to an exemplary embodiment of the present disclosure, the first clamper may include: a plurality of first clamping blocks installed at the first activation frame to be rotatable by the first clamp cylinder and pressing a flat part of the upper panel; a plurality of second clamping blocks installed to be rotatable at the first activation frame by the second clamp cylinder and pressing a bent part of the upper panel; and a plurality of third clamping blocks installed to be rotatable by the third clamp cylinder at the first activation frame and pressing an overlapping part of the bent part of the upper panel and the extension panel.

In the jig apparatus for assembling the trunk lid according to an exemplary embodiment of the present disclosure, the third clamping blocks may form a clamping line connected in a streamlined shape along the overlapping part of the bent part of the upper panel and the extension panel.

In the jig apparatus for assembling the trunk lid according to an exemplary embodiment of the present disclosure, the first clamper may further include at least one clamp finger installed at the first activation frame to be rotatable by the fourth clamp cylinder, rotating in the front and rear directions through the first jig base, and pressing the extension panel.

In the jig apparatus for assembling the trunk lid according to an exemplary embodiment of the present disclosure, the second clamper may include a plurality of clamp plates installed at the second activation frame to be rotatable by a fifth clamp cylinder and pressing the upper panel in a plan view.

Thus, since the exemplary embodiments of the present disclosure may align and double press the upper panel, the extension panel, and the lower panel in the single process jig and the laser brazing of these panels may be performed, the entire assembly process of the trunk lid may be simplified, assembly work time may be reduced, and a capital investment cost may be reduced.

Further, the effects which may be obtained or predicted by the exemplary embodiments of the present disclosure will be directly or implicitly disclosed in the detailed description of the exemplary embodiments of the present disclosure. That is, various effects which are predicted by the exemplary embodiments of the present disclosure will be disclosed in the detailed description to be described below.

BRIEF DESCRIPTION OF THE DRAWINGS

The drawings are presented to describe exemplary embodiments of the present disclosure, but the technical spirit of the present disclosure should not be interpreted as being limited to the accompanying drawings.

DETAILED DESCRIPTION OF THE EMBODIMENTS

Figure 1:
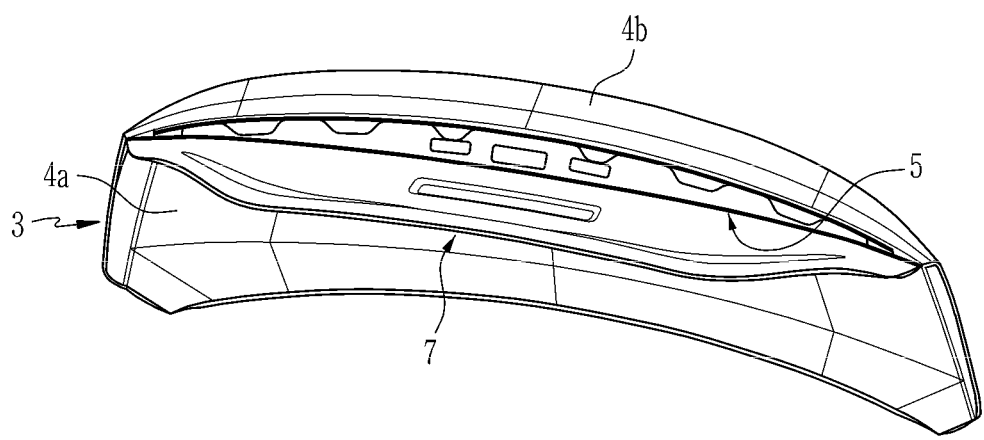
FIG. 1 is a view showing an example of a trunk lid applied to an exemplary embodiment of the present disclosure.
Figure 1:
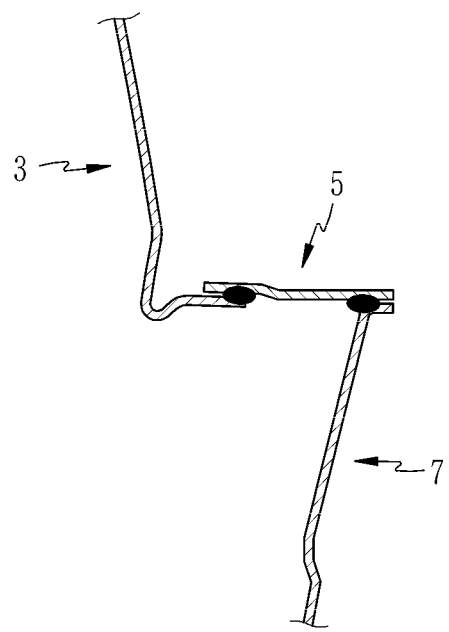

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

In the drawings, the size and thickness of each element are approximately shown for better understanding and ease of description. However, the present disclosure is not limited to the drawings, and the thicknesses of layers, films, panels, regions, etc., may be exaggerated for clarity.

disclosure FIG. 1 is a view showing an example of a trunk lid applied to an exemplary embodiment of the present disclosure.

Referring to FIG. 1, an exemplary embodiment of the present disclosure may be applied to a vehicle body part assembly process that assembles a trunk lid 1 as a moving part that is mounted on a vehicle body. The trunk lid 1 is provided as an assembly of panels molded by a press process, etc.

The trunk lid 1 includes an upper panel 3, an extension panel 5, and a lower panel 7 as a panel assembly of a three-piece type. As provided herein, a direction based on a vehicle body is set as a reference direction, and a configuration of the trunk lid 1 will be described based on the front, rear, left, right, and up and down directions.

Here, the upper panel 3 is made of a flat part 4a and a bent part 4b, and the bent part 4b preferably is bent downward from a rear side of the flat part 4a. The extension panel 5 on which a license plate lamp, a trunk opening/closing handle, a rear camera, etc. are mounted is connected to a lower end of the upper panel 3, that is, a lower edge of the bent part 4b. Also, the lower panel 7 is a panel on which the license plate is mounted, and one edge part is connected to the extension panel 5 and is disposed in the lower direction. The remaining edge part of the lower panel 7 forms a bent part folded for hemming.

Figure 2A:
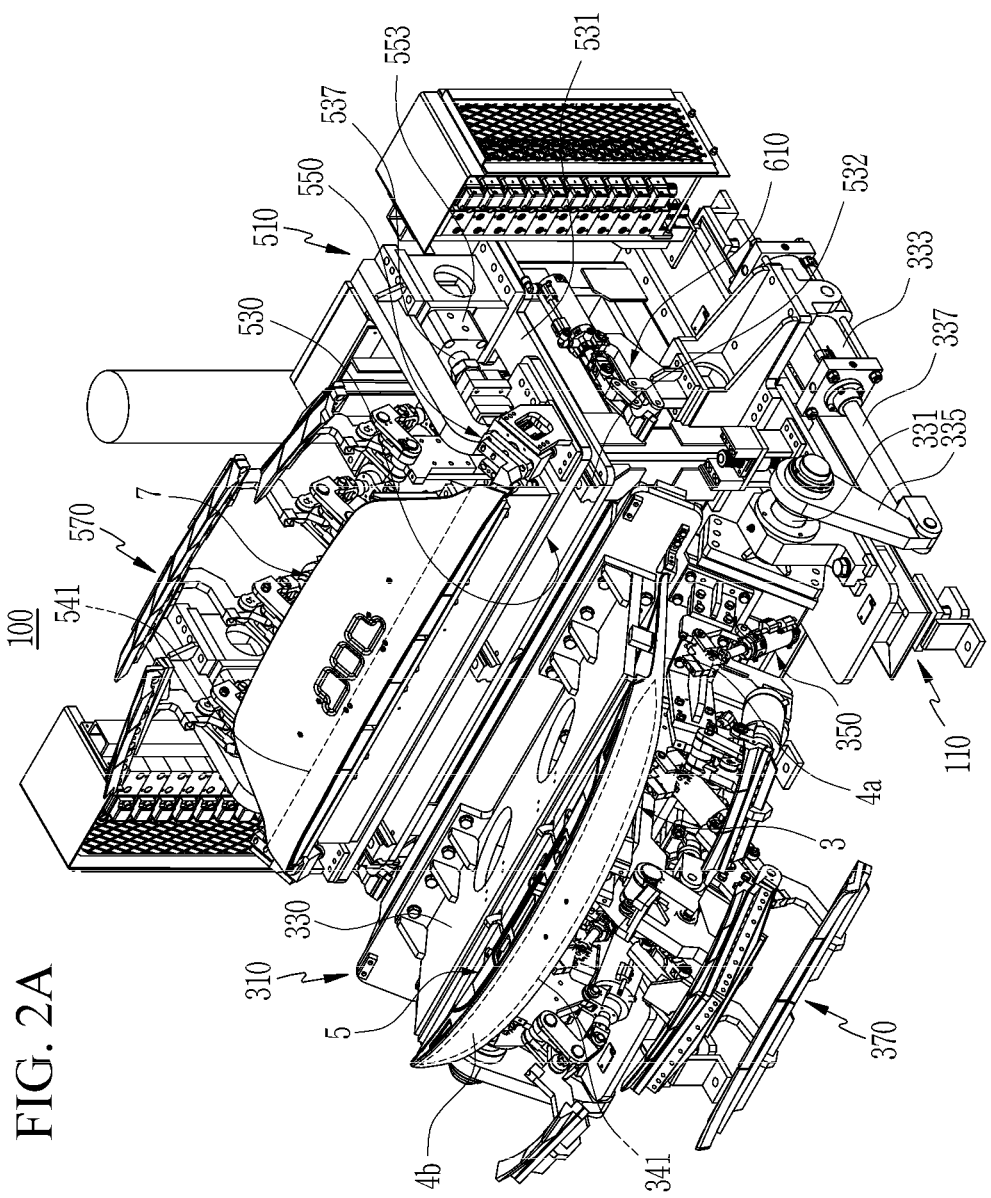
FIG. 2A and FIG. 2B are perspective views showing a jig apparatus for assembling a trunk lid according to an exemplary embodiment of the present disclosure.
Figure 2B:
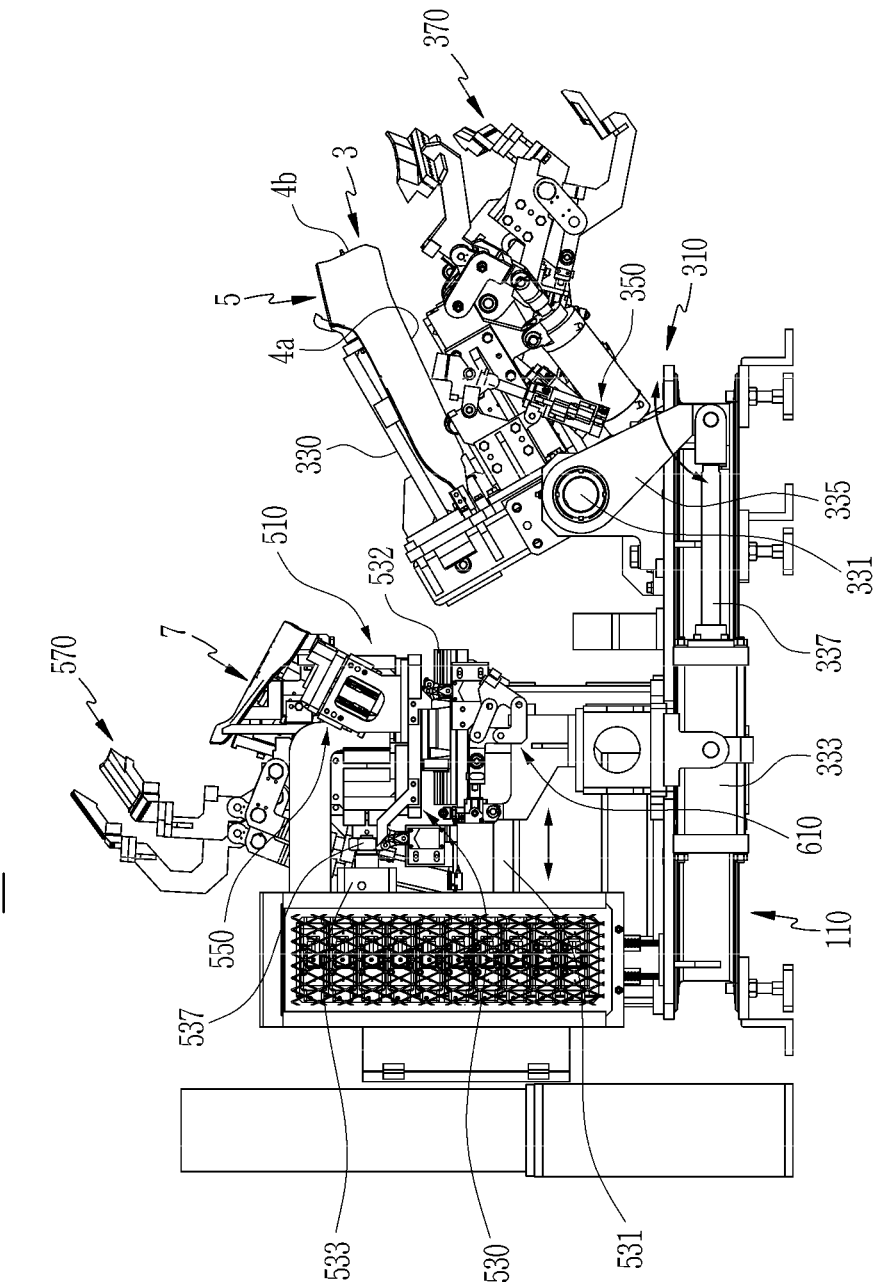
Figure 3A:
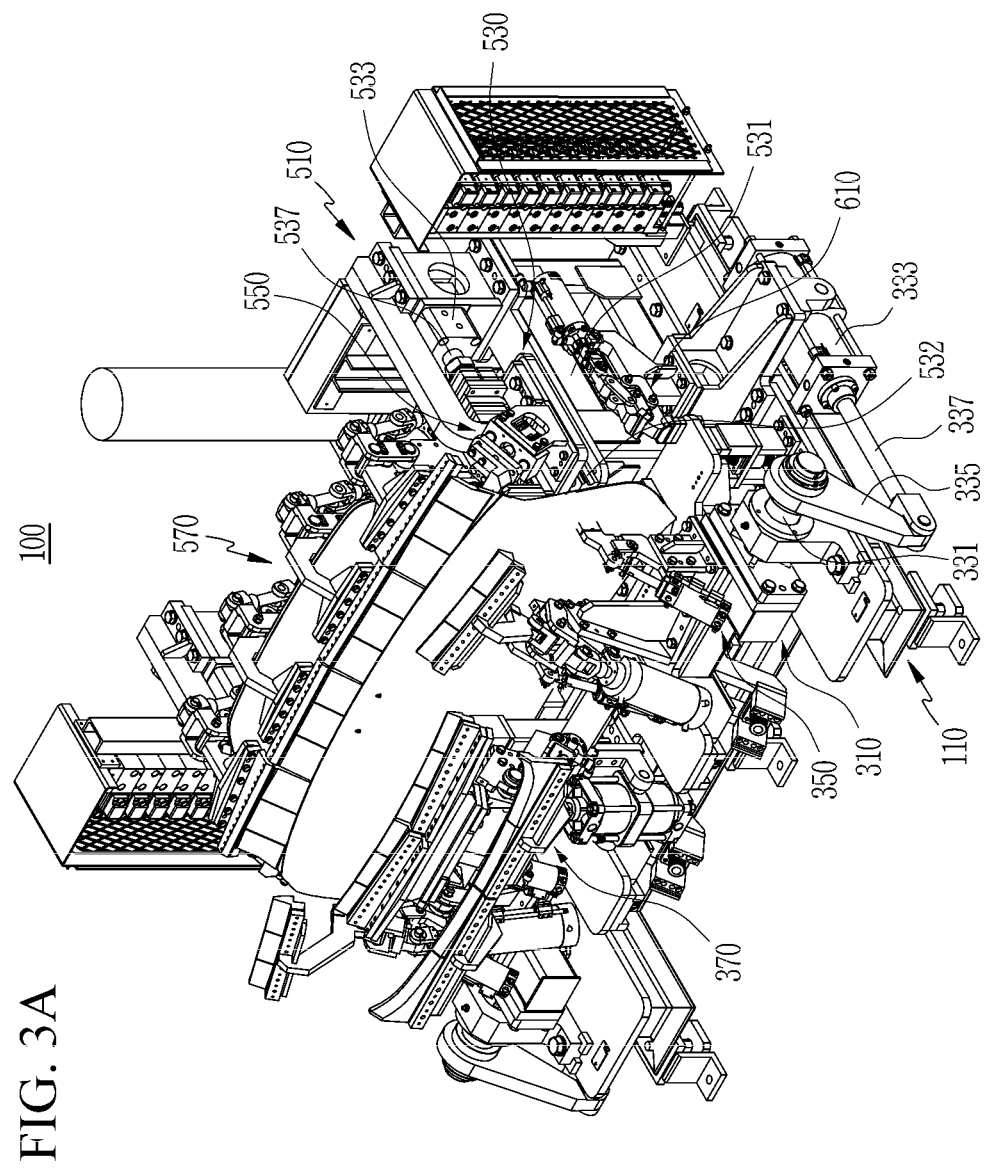
FIG. 3A and FIG. 3B are lateral schematic diagrams showing a jig apparatus for assembling a trunk lid according to an exemplary embodiment of the present disclosure.
Figure 3B:
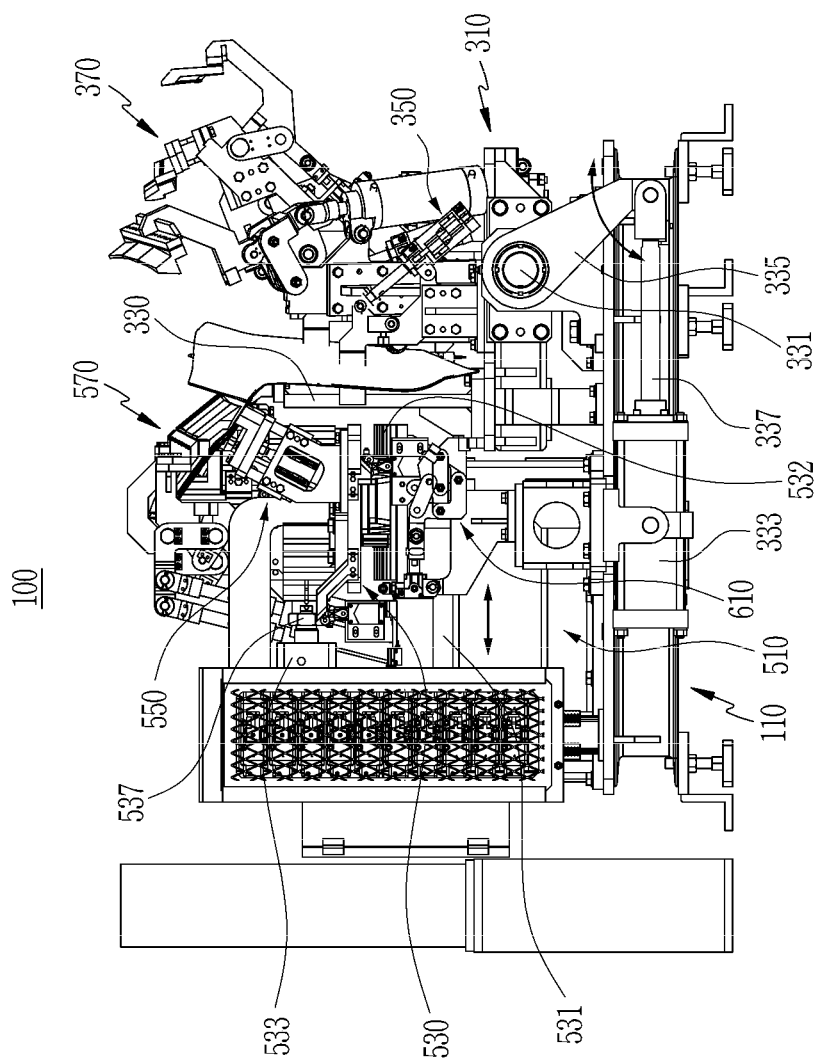

FIG. 2A and FIG. 2B are perspective views showing a jig apparatus for assembling a trunk lid according to an exemplary embodiment of the present disclosure, and FIG. 3A and FIG. 3B are lateral schematic diagrams showing a jig apparatus for assembling a trunk lid according to an exemplary embodiment of the present disclosure.

Referring to FIG. 2A to FIG. 3B, the trunk lid assembling jig apparatus 100 according to an exemplary embodiment of the present disclosure is used to assemble the upper panel 3, the extension panel 5, and the lower panel 7 as three separate pieces into a single structure chain trunk lid 1 (see FIG. 1).

Further, the trunk lid assembling jig apparatus 100 according to an exemplary embodiment of the present disclosure is configured to align and fix the upper panel 3, the extension panel 5, and the lower panel 7, and assemble these panels 3, 5, and 7 with a laser brazing method.

However, it should be understood that the scope of the present disclosure is not necessarily limited thereto, and the technical idea of the present disclosure may be applied to assemble metal panel assembly parts of various types and usages with the laser brazing method.

Here, the laser brazing method may be defined as a method irradiating continuous wave Nd:YAG laser beams oscillated by a laser oscillator to a matching part of welding object panels to melt a filler wire of a filler material, thereby brazing and bonding the welding object panels.

Typically, in the related art, a vehicle body length direction is referred to as a T direction, a vehicle width direction is referred to as an L direction, and a height direction of the vehicle body is referred to as an H direction. However, in the exemplary embodiment of the present disclosure, the L, T, and H directions are not set as the reference directions, but the forward, backward, left, right, and up and down directions are set as the reference directions based on the drawings.

However, since the definition of the reference direction as described above is relative and may be varied depending on the reference position of the present apparatus 100 or the reference position of the assembly part and the like, the reference direction is necessarily not limited to the reference direction of the present exemplary embodiment.

The trunk lid assembling jig apparatus 100 according to an exemplary embodiment of the present disclosure is configured to align and fix the upper panel 3, the extension panel 5, and the lower panel 7 in a single process, and laser-blaze these panels to be welded.

That is, an exemplary embodiment of the present disclosure utilizes a single process jig as the trunk lid assembling jig apparatus 100 that realizes the aligning/fixing of the upper panel 3, the extension panel 5, and the lower panel 7, primary laser brazing of the upper panel 3 and the extension panel 5, and secondary laser brazing of the lower panel 7 and the extension panel 5.

In particular, the trunk lid assembling jig apparatus 100 according to an exemplary embodiment of the present disclosure includes a jig frame 110, a first activation jig unit 310, and a second activation jig unit 510, which will be described below, respectively.

The jig frame 110 supports each constituent element described below and is disposed in a plane direction on a floor of the workplace, and may be composed of one frame or a frame divided into two or more thereof.

The jig frame 110 may include various sub-elements such as a plate, a housing, a case, a collar, a rod, and a block for supporting various constituent elements to be described below.

However, since the above-described various sub-elements are arranged for installing the constituent elements of the apparatus 100 to be described below in the jig frame 110, in the exemplary embodiment of the present disclosure, except for exceptional cases, the above-described various sub-elements are collectively referred to as the jig frame 110.

In an exemplary embodiment of the present disclosure, the first activation jig unit 310 is used to align and fix the upper panel 3 and the extension panel 5, and is rotatably installed in the jig frame 110 in the front and rear directions.

The first activation jig unit 310 may align and fix the upper panel 3 and the extension panel 5 so that a lower edge of the upper panel 3 and a first side edge of the extension panel 5 mutually overlap.

Here, the first activation jig unit 310 may align and fix the upper panel 3 and the extension panel 5 in a tilted and rotated state in a direction away (e.g., forward) from the second activation jig unit 510, which will be described later.

In the first activation jig unit 310, in the state in which the upper panel 3 and the extension panel 5 are aligned and fixed, as described above, the primary laser brazing may be performed at the overlapped part of the upper panel 3 and the extension panel 5 through a brazing assembly (not shown).

The first activation jig unit 310 includes a first activation frame 330, a first aligning unit 350, and a first clamper 370.

The first activation frame 330 for supporting each constituent element described below may include various sub-elements such as a plate, a housing, a case, a collar, a rod, and a block for supporting various constituent elements. However, since the above-described various sub-elements are arranged for installing the constituent elements of the present apparatus 100 to be described below in the first activation frame 330, in the exemplary embodiment of the present disclosure, except for exceptional cases, the above-described various sub-elements are collectively referred to as the first activation frame 330.

The first activation frame 330 is erected in the vertical direction on the jig frame 110, and is rotatably installed in the jig frame 110 in the front and rear directions. The first activation frame 330 is tilted rotatably coupled to the jig frame 110 through a tilting rotation axis 331.

The first activation frame 330 may be tilted and rotated in the front and rear directions on the jig frame 110 by a first driving cylinder 333. The first driving cylinder 333 is cylindrically actuated by air pressure or hydraulic pressure, and is equipped with a known cylinder device for tilting and rotating the first activation frame 330 in the front and rear directions.

The first driving cylinder 333 is mounted on both sides of the jig frame 110 and is installed to be connected to the first activation frame 330. The first driving cylinder 333 is connected with both ends of the tilting rotation axis 331 through a rotation bracket 335.

This first driving cylinder 333 may tilting-rotate the first activation frame 330 in the front and rear directions by applying a forward/backward actuation force to the rotation bracket 335 through an actuating rod 337 in the front and rear directions.

Further, the first activation frame 330 as described above includes a first jig base 341 supporting the upper panel 3 and the extension panel 5. The first jig base 341 is disposed along the left and right directions at the top of the first activation frame 330, and is provided in a block shape to support the bent part 4b of the upper panel 3 and the extension panel 5.

The first aligning unit 350 is configured to align the upper panel 3 and the extension panel 5 at a predetermined position of the first jig base 341. The first aligning unit 350 may align the upper panel 3 and the extension panel 5 to the first jig base 341 so that the lower edge of the upper panel 3 and the first side edge of the extension panel 5 overlap each other.

Figure 4A:
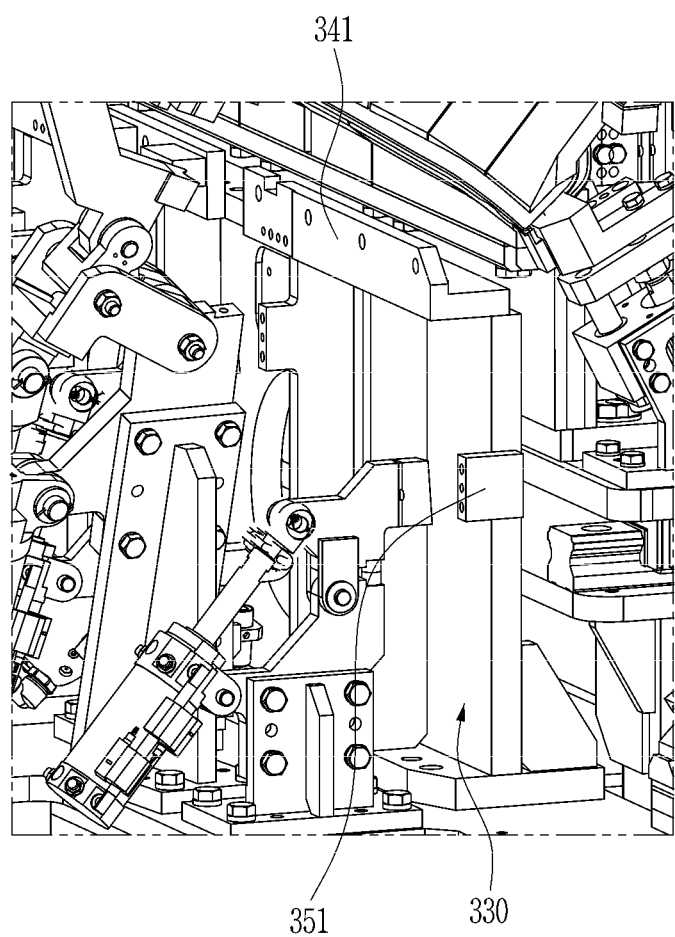
FIG. 4A and FIG. 4B are views showing a first aligning unit of a first activation jig unit applied to a jig apparatus for assembling a trunk lid according to an exemplary embodiment of the present disclosure.
Figure 4B:
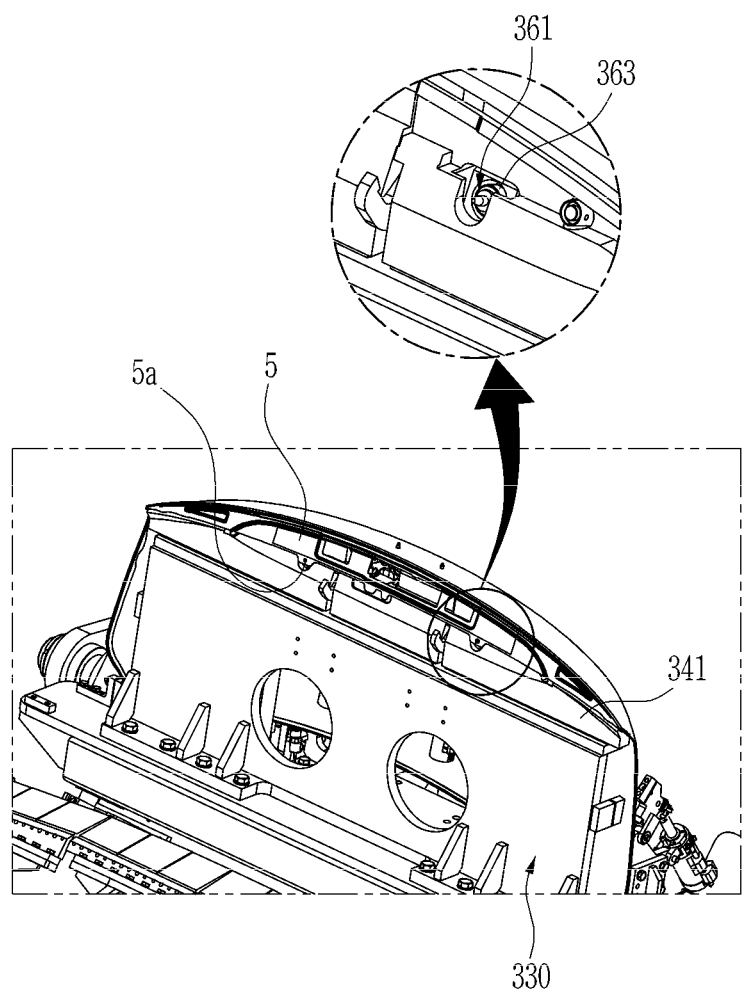

As shown in FIG. 4A and FIG. 4B, the first aligning unit 350 includes a first alignment locator 351 and a position determining pin 361 installed in the first activation frame 330.

The first alignment locator 351 is configured to support the flat part 4a of the upper panel 3, and as shown in FIG. 4A, is installed in plural in the first activation frame 330 along the left and right directions. The first alignment locator 351 is in a block form and is fixedly installed to the first activation frame 330.

The position determining pin 361 is configured to align the extension panel 5 to the first jig base 341, and as shown in FIG. 4B, is installed in a pair in the first activation frame 330.

The position determining pin 361 is installed to be movable in the up and down directions through the first jig base 341 by a pin cylinder 363 fixed to the first activation frame 330. The position determining pin 361 is connected with the actuating rod of the pin cylinder 363. The position determining pin 361 is inserted into a reference hole 5a of the extension panel 5 by the foreword actuation of the actuating rod, and may align the position of the extension panel 5.

The first clamper 370 clamps the upper panel 3 and the extension panel 5, which are arranged at the predetermined position of the first jig base 341 by the first aligning unit 350, respectively, and is to be fastened to the first jig base 341.

The first clamper 370, as shown in FIG. 5A to FIG. 5D, includes first clamping blocks 371, second clamping blocks 373, third clamping blocks 375, and clamp fingers 377, which are installed to the first activation frame 330.

Figure 5A:
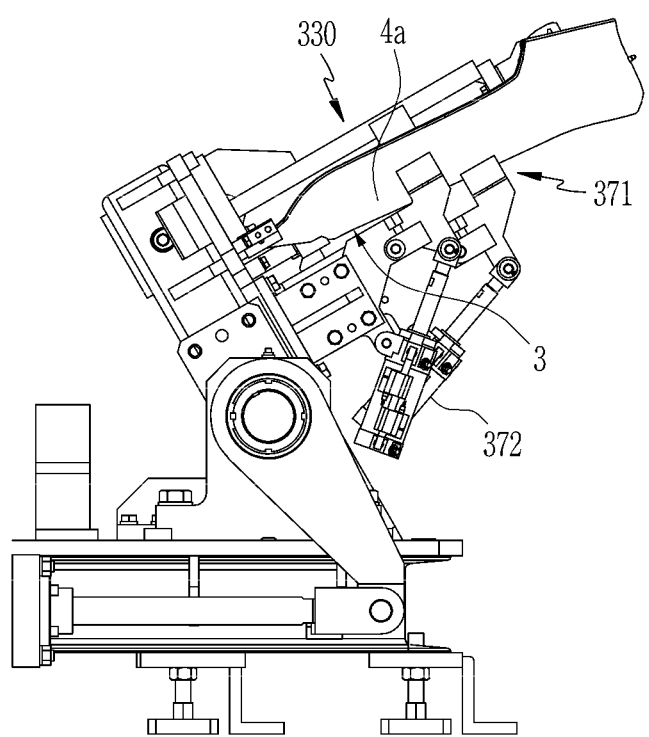
FIG. 5A to FIG. 5D are views showing a first clamper of a first activation jig unit applied to a jig apparatus for assembling a trunk lid according to an exemplary embodiment of the present disclosure.

The first clamping blocks 371 are arranged for pressing and clamping the flat part 4a of the upper panel 3, and as shown in FIG. 5A, are installed in plural at the first activation frame 330 along the left and right directions.

The first clamping block 371 is rotatably installed to the first activation frame 330 by a first clamp cylinder 372. The first clamping block 371 is hinge-coupled to the front of the actuating rod of the first clamp cylinder 372 fixed to the first activation frame 330 through the locator.

Figure 5B:
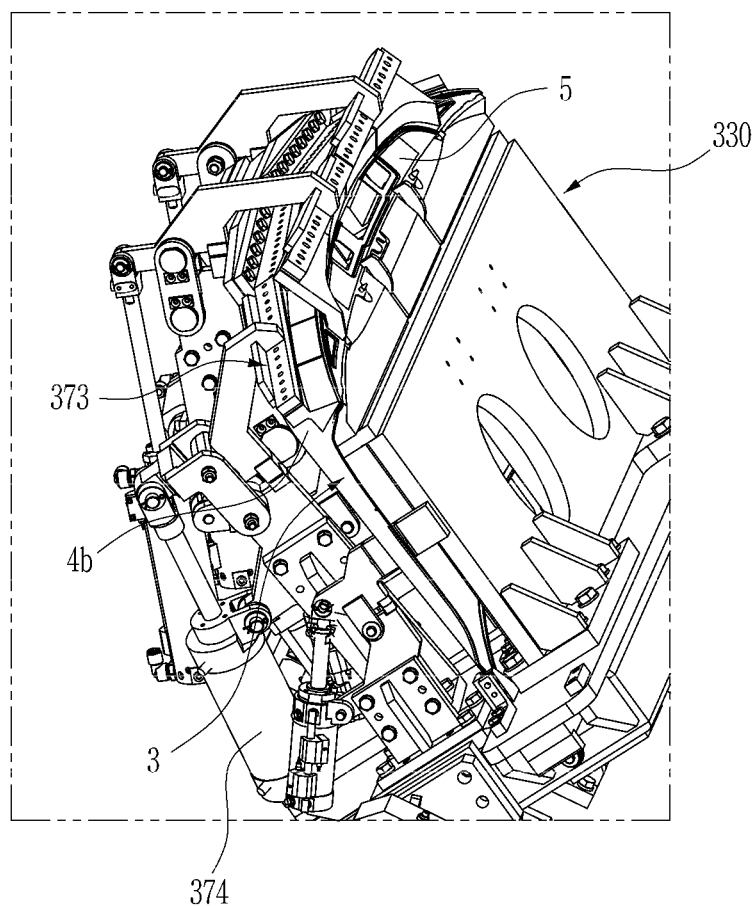

The second clamping blocks 373 are arranged for pressing and clamping the bent part 4b of the upper panel 3, as shown in FIG. 5B, and are installed to the first activation frame 330 along the left and right directions.

The second clamping block 373 is rotatably mounted to the first activation frame 330 by a second clamp cylinder 374. The second clamping block 373 is hinge-coupled to an actuating rod tip of the second clamp cylinder 374 fixed to the first activation frame 330 via the locator.

Figure 5C:
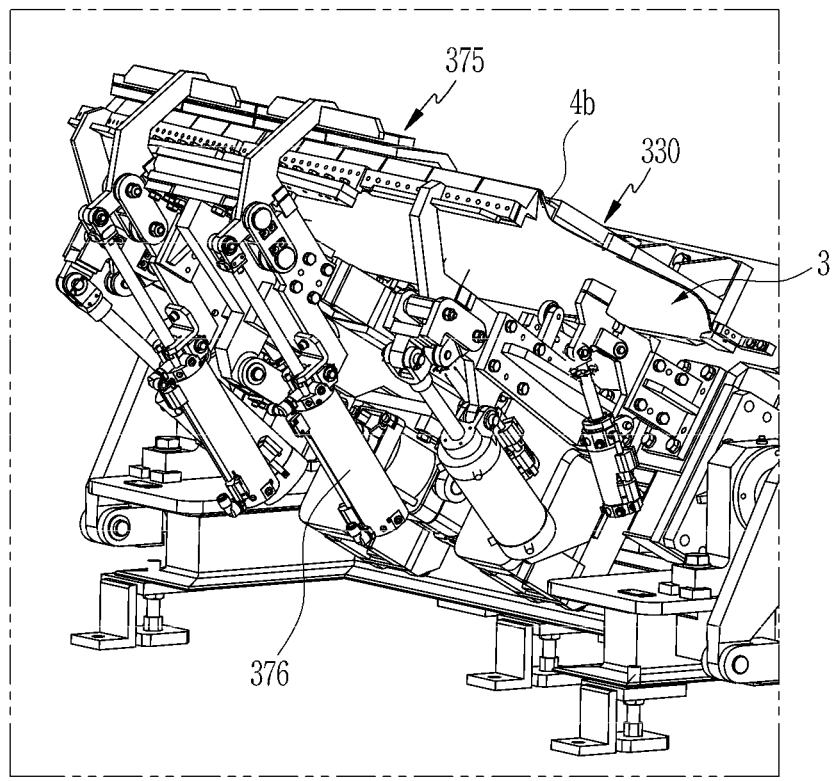
Figure 5C:
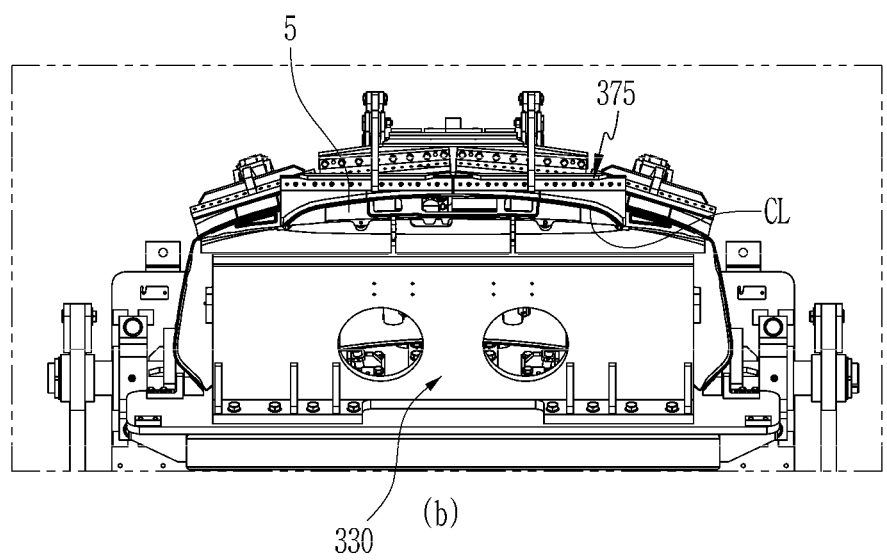

The third clamping blocks 375 are arranged for pressing and clamping the overlap of the bent part 4b of the upper panel 3 and the extension panel 5, as shown in FIG. 5C, and are installed to the first activation frame 330 along the left and right directions.

The third clamping block 375 is rotatably installed to the first activation frame 330 by a third clamp cylinder 376. The third clamping block 375 is hinge-coupled to an actuating rod tip of the third clamp cylinder 376 fixed to the first activation frame 330 via the locator.

Here, the third clamping blocks 375 may form a clamping line CL connected in a streamlined shape along the overlapping portion of the bent part 4b of the upper panel 3 and the extension panel 5.

Figure 5D:
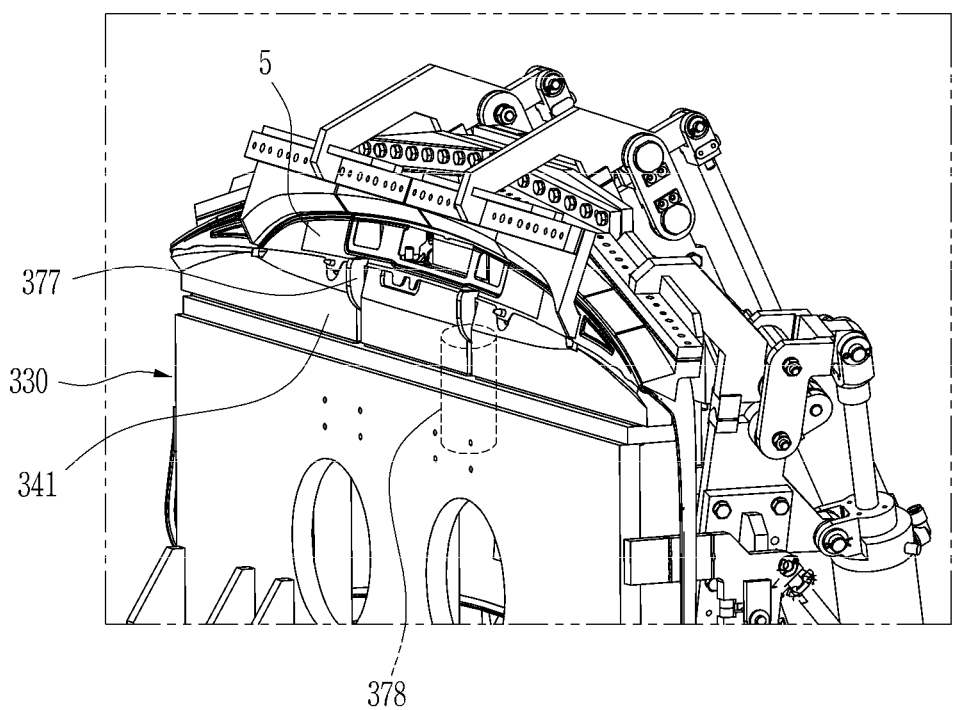

The clamp fingers 377 are arranged for pressing and clamping the extension panel 5, and as shown in FIG. 5D, is rotatably installed to the first activation frame 330.

The clamp fingers 377 are paired along the left and right directions of the first activation frame 330 and rotatably installed in the front and rear directions through the first jig base 341 by a fourth clamp cylinder 378. The clamp fingers 377 are provided with a finger shape, and are hinge-coupled to the front end of the actuating rod of the fourth clamp cylinder 378 fixed to the first activation frame 330.

Referring to FIG. 2A to FIG. 3B, the second activation jig unit 510 according to an exemplary embodiment of the present disclosure is configured to align and fix the lower panel 7, and is installed to be linearly movable in the front and rear directions at the jig frame 110 with respect to the first activation jig unit 310.

The second activation jig unit 510 may align and fix the lower panel 7 so that the lower panel 7 is in mutual contact with a second side edge of the extension panel 5. That is, the second activation jig unit 510 may align and fix the lower panel 7 so that the extension panel 5 and the lower panel 7 are in contact with each other in the state in which the primary laser brazing for the overlapped portion of the upper panel 3 and the extension panel 5 is performed in the first activation jig unit 310.

Here, in a state where the first activation jig unit 310 is tilted and rotated in the direction approaching the second activation jig unit 510 (for example, rearward), the second activation jig unit 510 linearly moves toward the first activation jig unit 310 and may press the panel 7 against the second side edge of the extension panel 5.

In the state where the first activation jig unit 310 is tilted and rotated in the direction approaching the second activation jig unit 510, the secondary laser brazing for the facing portion of the lower panel 7 and the extension panel 5 may be performed between the first and second activation jig units 310 and 510 through a brazing assembly (not shown).

The second activation jig unit 510 includes a second activation frame 530, a second aligning unit 550, and a second clamper 570.

The second activation frame 530 is configured to support each constituent element described below, and may include various sub-elements such as a plate, a housing, a case, a collar, a rod, and a block for supporting various constituent elements. However, since the above-described various sub-elements are arranged for installing the constituent elements to be described below in the second activation frame 530, except for an exceptional case, in an exemplary embodiment of the present disclosure, the sub-elements are collectively referred to as the second activation frame 530.

The second activation frame 530 is installed in a fixing frame 531 on the jig frame 110 so as to be linearly reciprocable in the front and rear directions. The second activation frame 530 is installed to be linearly reciprocable in the front and rear directions through a guide rail 532 corresponding to the first activation frame 330.

The second activation frame 530 may be linearly reciprocated in the front and rear directions on the fixing frame 531 by a second driving cylinder 533. The second driving cylinder 533 is cylindrically actuated by air pressure or hydraulic pressure cylinders, and is equipped with a known cylinder device that linearly reciprocates the second activation frame 530 in the front and rear directions.

The second driving cylinder 533 is installed on the left and right sides of the fixing frame 531 to be connected to the second activation frame 530. This second driving cylinder 533 is capable of linearly reciprocating the second activation frame 530 to the front and rear directions by applying the forward and backward actuation force to the second activation frame 530 through an actuating rod 537 in the front and rear directions.

Further, the second activation frame 530 as described above includes a second jig base 541 supporting the lower panel 7. The second jig base 541 is installed to be inclined toward the first activation frame 330 along the left and right directions in the second activation frame 530, and is provided as a plate type supporting the lower panel 7.

The second aligning unit 550 is configured to align the lower panel 7 at a predetermined position of the second jig base 541. The second aligning unit 550 may align the lower panel 7 to the second jig base 541 so that the lower panel 7 is in contact with the second side edge of the extension panel 5.

Figure 6A:
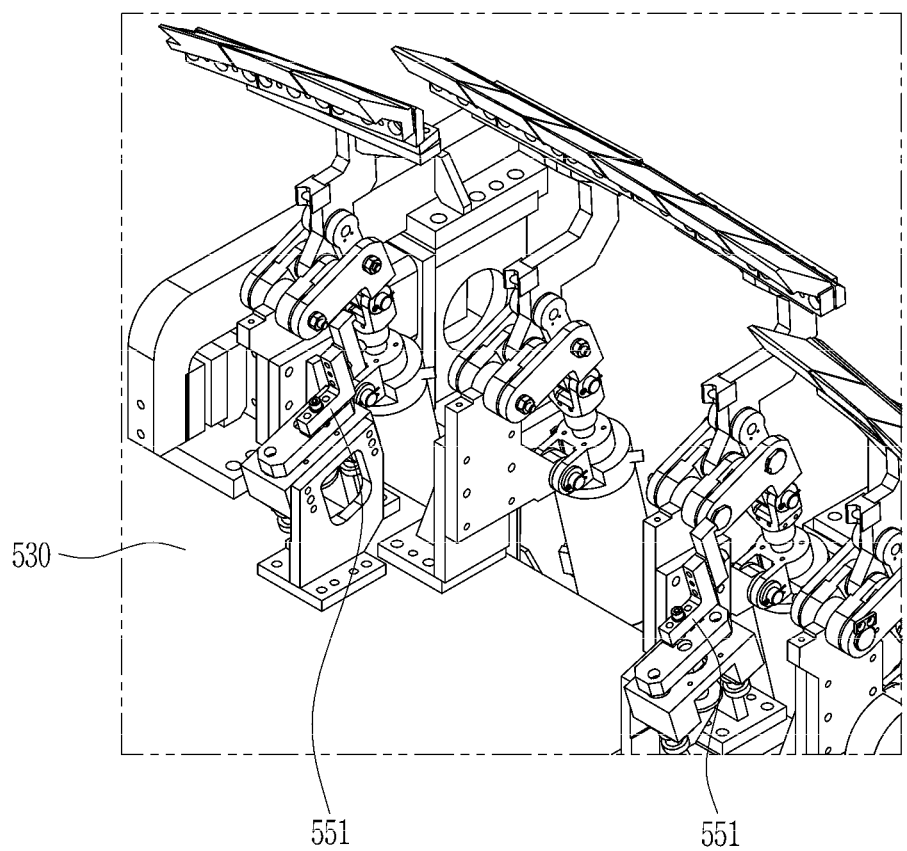
FIG. 6A to FIG. 6C are views showing a second aligning unit of a second activation jig unit applied to a jig apparatus for assembling a trunk lid according to an exemplary embodiment of the present disclosure.
Figure 6B:
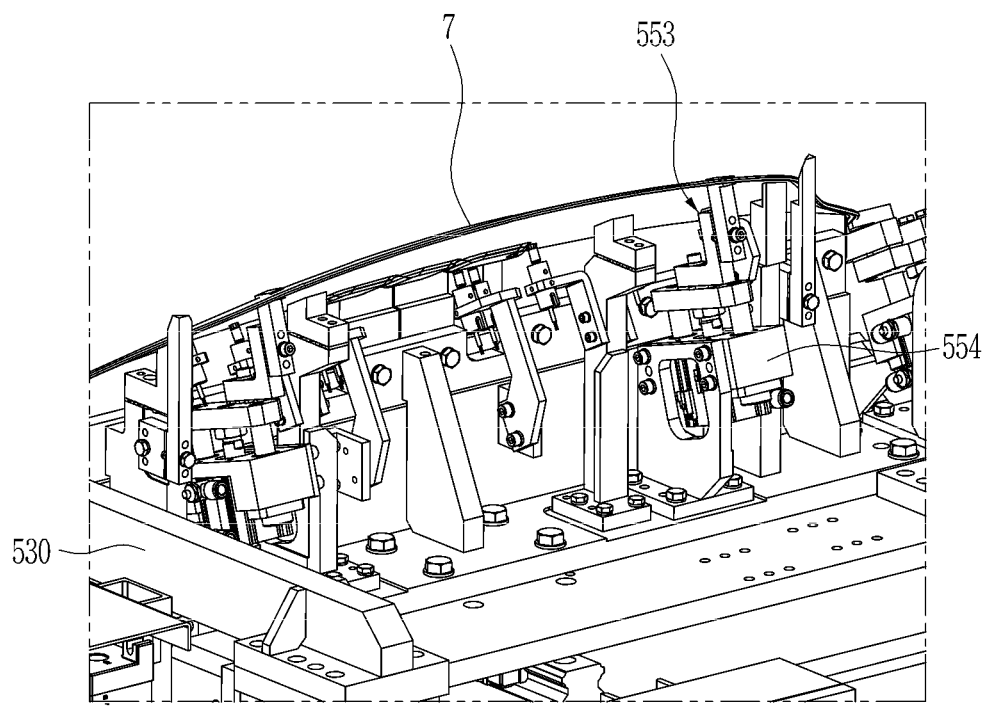
Figure 6C:
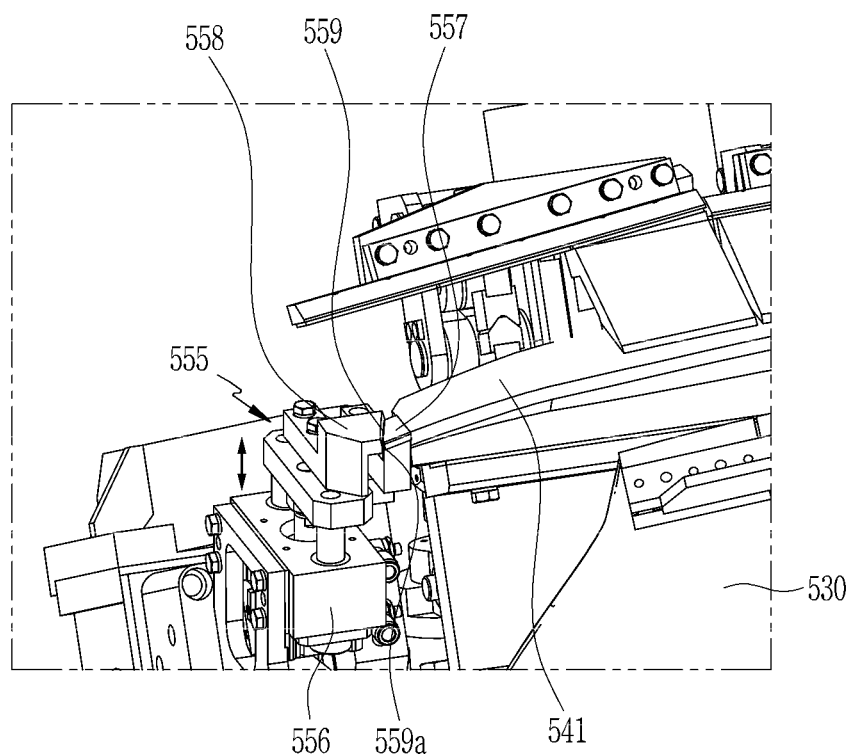

The second aligning unit 550, as shown in FIG. 6A to FIG. 6C, includes a second alignment locator 551, a third alignment locator 553, and a fourth alignment locator 555, which are installed in the second activation frame 530.

The second alignment locator 551 is configured to support the flat part of the lower panel 7, as shown in FIG. 6A, and is installed in plural in the second activation frame 530 corresponding to the second jig base 541 along the left and right directions. The second alignment locator 551 is provided in a block shape of an approximate 'L', and is fixedly installed in the second activation frame 530.

The third alignment locator 553 is configured to support the edge bent part of the lower panel 7, as shown in FIG. 6B, and one or more third alignment locators 553 are installed in the second activation frame 530.

The third alignment locator 553 is movably installed in the up and down directions by a first locator cylinder 554 fixed to the second activation frame 530. The third alignment locator 553 with a block form is fixedly installed at the front end of the actuating rod of the first locator cylinder 554.

The fourth alignment locator 555 is configured to support both end bent parts of the lower panel 7, and as shown in FIG. 6C, is installed at the right and left sides of the second activation frame 530.

The fourth alignment locator 555 is disposed to be inclined toward the first activation frame 330 corresponding to the second jig base 541 in the second activation frame 530. The fourth alignment locator 555 is installed to be movable in the up and down directions by a second locator cylinder 556 fixed to the second activation frame 530. The fourth alignment locator 555 with the block shape is installed to be fixed to an actuating rod tip of the second locator cylinder 556.

Here, the fourth alignment locator 555 includes a first locator block 557 and a second locator block 558. The first locator block 557 may be connected while forming a same flat surface as both end parts of the second jig base 541. Also, the second locator block 558 is connected to the first locator block 557. The second locator block 558 forms an end step 559 supporting both end bent parts of the lower panel 7 via the first locator block 557 interposed therebetween.

Further, a gap 559a to which the both bent ends of the lower panel 7 may be inserted is formed between the first locator block 557 and the end step 559 of the second locator block 558.

The second clamper 570 is configured to clamp the lower panel 7 aligned at the predetermined position of the second jig base 541 by the second aligning unit 550 to be fixed to the second jig base 541.

Figure 7:
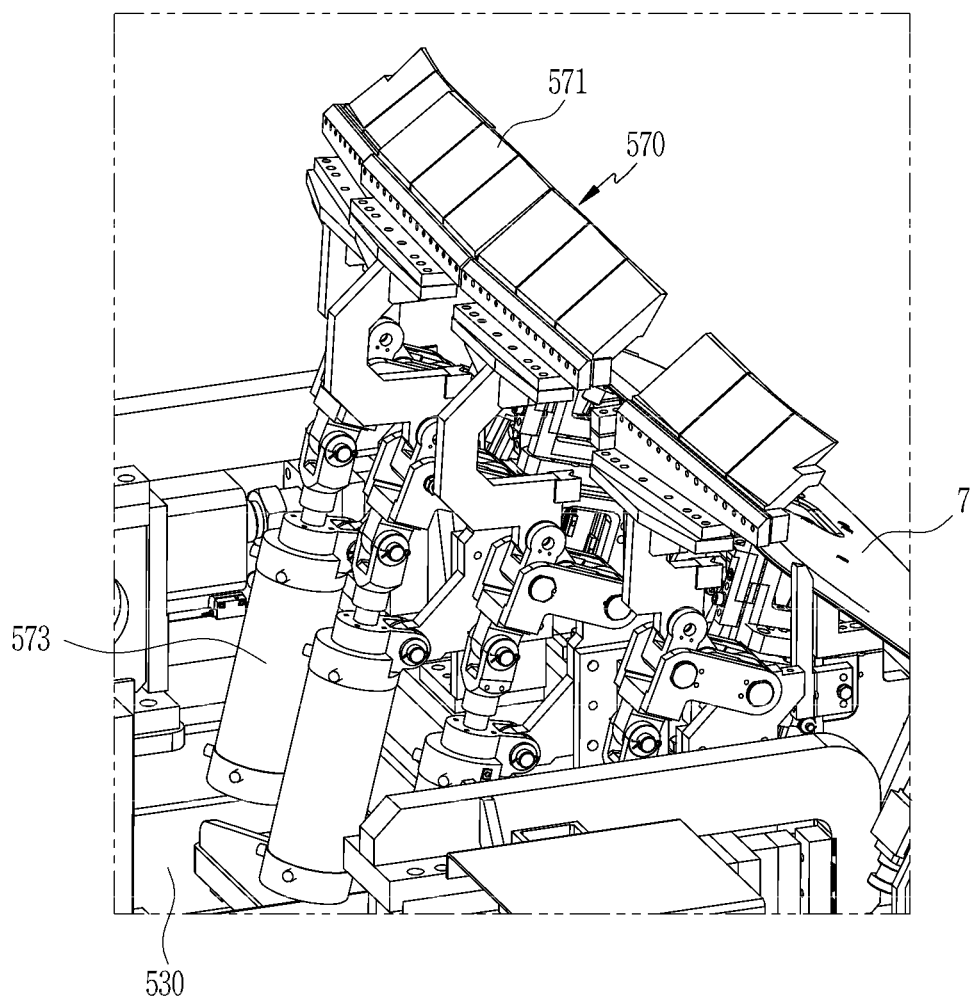
FIG. 7 is a view showing a second clamper of a second activation jig unit applied to a jig apparatus for assembling a trunk lid according to an exemplary embodiment of the present disclosure.

The second clamper 570 includes, as shown in FIG. 7, clamp plates 571 installed at the second activation frame 530. The clamp plates 571 are arranged for pressing and clamping the lower panel 7 aligned to the second jig base 541 in a plan view, and are installed in plural along the left and right directions in the second activation frame 530.

The clamp plate 571 is rotatable installed to the second activation frame 530 by a fifth clamp cylinder 573. The clamp plate 571 is hinge-coupled to an actuating rod tip of the fifth clamp cylinder 573 fixed to the second activation frame 530 through the locator.

On the other hand, in an exemplary embodiment of the present disclosure, as shown in FIG. 2A to FIG. 3B, in the state in which the first activation frame 330 is tilting-rotated in the direction closer to the second activation frame 530, a locking unit 610 for locking the first activation frame 330 to the fixing frame 531 is further included.

That is, at the time that the primary laser brazing of the upper panel 3 and the extension panel 5 is completed in the first activation jig unit 310, the locking unit 610 is configured to fix the first activation frame 330 tilting-rotated in the second activation frame 530 side to the fixing frame 531 of the second activation jig unit 510.

Figure 8:
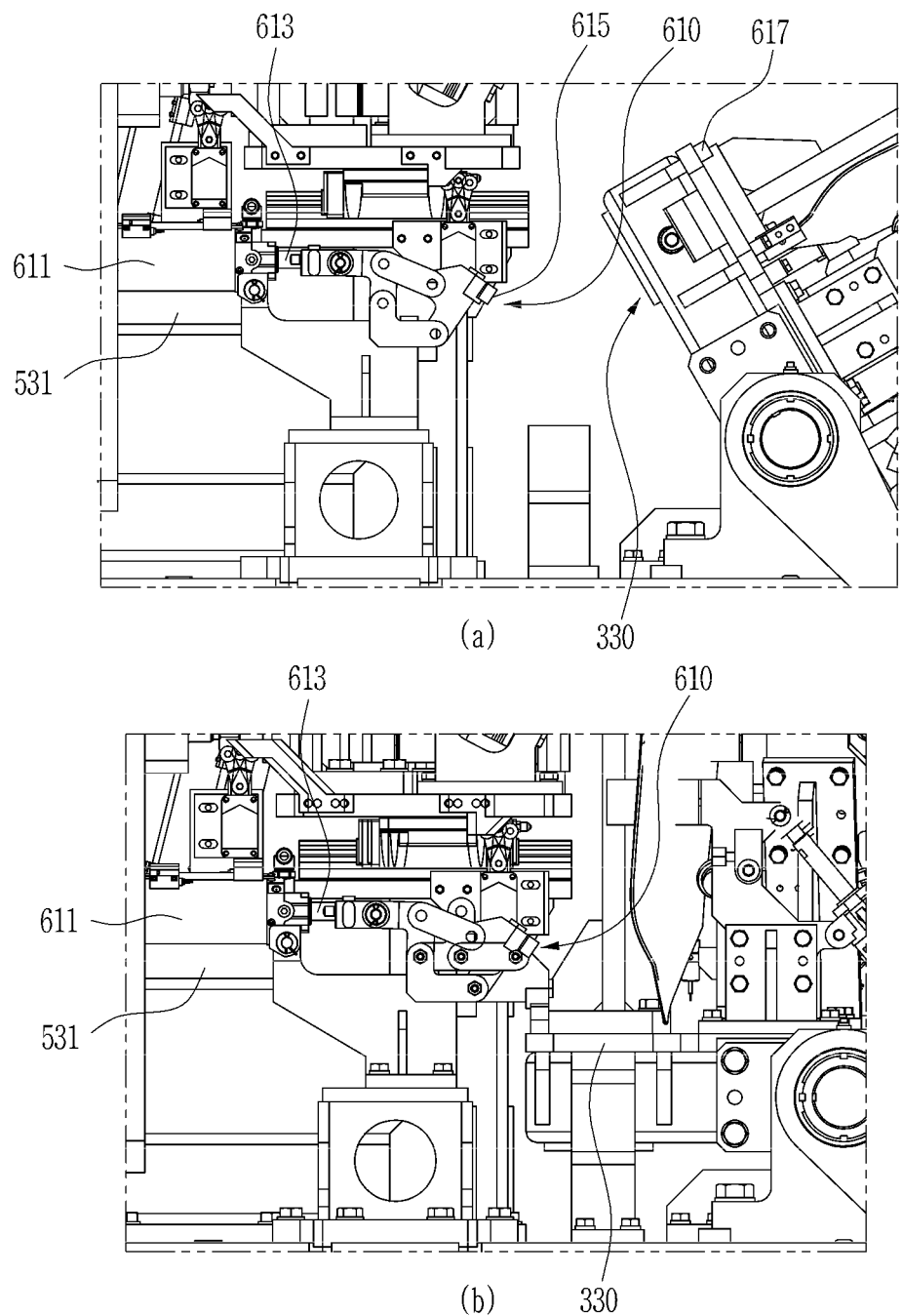
FIG. 8 is a view showing a locking unit applied to a trunk lid of a jig apparatus for assembling a trunk lid according to an exemplary embodiment of the present disclosure.

The locking unit 610, as shown in FIG. 8, includes a locking cylinder 611 and a locking block 615. The locking cylinder 611 is installed in the fixing frame 531, and is disposed along the front and rear directions in the fixing frame 531.

The locking block 615 is hinge-coupled to an actuating rod 613 tip of the locking cylinder 611, and is rotatably installed to the fixing frame 531. If the actuating rod 613 of the locking cylinder 611 is actuated back and forth, the locking block 615 is rotated along the front and rear directions in the state in which the locking block 615 is hinge-coupled to the actuating rod 613 and the fixing frame 531.

Further, a docking block 617 to which the locking block 615 is selectively locked and unlocked is fixedly installed corresponding to the locking block 615 at the first activation frame 330.

Thus, in the state in which the first activation frame 330 is tilting-rotated in the direction closer to the second activation frame 530, if the actuating rod 613 of the locking cylinder 611 is actuated forward, the locking block 615 may be locked with the docking block 617 while being rotated in the first activation frame 330.

In contrast, if the actuating rod 613 of the locking cylinder 611 is actuated backward, the locking block 615 may be unlocked from the docking block 617 while being rotated in the second activation frame 530 side.

Hereinafter, the operation of the trunk lid assembling jig apparatus 100 according to an exemplary embodiment of the present disclosure will be described in detail with reference to the previously-disclosed drawings.

First, in an exemplary embodiment of the present disclosure, the first activation frame 330 of the first activation jig unit 310 is in the state in which it is tilting-rotated in the direction away from the second activation frame 530 of the second activation jig unit 510 by the backward actuation of the first driving cylinder 333.

Also, in an exemplary embodiment of the present disclosure, the second activation frame 530 of the second activation jig unit 510 is in the state in which it is linearly moved in the direction away from the first activation frame 330 of the first activation jig unit 310 by the backward actuation of the second driving cylinder 533.

In this state, the extension panel 5 and the upper panel 3 are sequentially loaded in the first activation frame 330 and the lower panel 7 is loaded in the second activation frame 530 in an exemplary embodiment of the present disclosure.

In an exemplary embodiment of the present disclosure, the extension panel 5 and the bent part 4b of the upper panel 3 are seated at a predetermined position of the first jig base 341, and the lower panel 7 is seated at a predetermined position of the second jig base 541.

In this process, in an exemplary embodiment of the present disclosure, the position determining pin 361 of the first aligning unit 350 is moved by the forward operation of the pin cylinder 363, the position determining pin 361 is inserted into the reference hole 5a of the extension panel 5, and the extension panel 5 is aligned. Also, in an exemplary embodiment of the present disclosure, the flat part 4a of the upper panel 3 is aligned through the first alignment locator 351 of the first aligning unit 350.

Here, the upper panel 3 and the extension panel 5 are aligned by the first aligning unit 350 so that the edge part of the bent part 4b of the upper panel 3 and the first side edge part of the extension panel 5 are overlapped to each other.

Also, in an exemplary embodiment of the present disclosure, the flat part of the lower panel 7 is aligned through the second alignment locator 551 of the second aligning unit 550. In addition, in an exemplary embodiment of the present disclosure, the third alignment locator 553 is moved forward in the upper direction through the first locator cylinder 554, and the edge bent part of the lower panel 7 is aligned through the third alignment locator 553.

Further, in the exemplary embodiment of the present disclosure, the fourth alignment locator 555 of the second aligning unit 550 is moved forward to the upper direction through the second locator cylinder 556, and both end bent parts of the lower panel 7 are aligned through the fourth alignment locator 555.

Here, the first locator block 557 of the fourth alignment locator 555 forms the same flat surface as both ends of the second jig base 541, and aligns both end bent parts of the lower end of the lower panel 7. Further, the second locator block 558 of the fourth alignment locator 555 supports both end bent parts of the lower panel 7 through the end step 559.

In this case, in an exemplary embodiment of the present disclosure, the bent end of the lower panel 7 is inserted into the gap 559a between the first locator block 557 and the end step 559, and may align both end bent parts of the lower panel 7.

As described above, in the state in which the upper panel 3 and the extension panel 5 are aligned to the first activation frame 330 and the lower panel 7 is aligned to the second activation frame 530, in an exemplary embodiment of the present disclosure, the first clamping block 371 is rotated through the first clamp cylinder 372, and the flat part 4a of the upper panel 3 is pressed and clamped through the first clamping block 371.

In addition, in an exemplary embodiment of the present disclosure, the second clamping block 373 is rotated through the second clamp cylinder 374, and the bent part 4b of the upper panel 3 is pressed and clamped by the second clamping block 373.

Also, in an exemplary embodiment of the present disclosure, the third clamping block 375 is rotated through the third clamp cylinder 376 and the overlapping part of the bent part 4b of the upper panel 3, and the extension panel 5 is pressed and clamped through the third clamping block 375.

Here, the third clamping blocks 375 forms a clamping line CL connected in a streamlined shape along the overlapping part of the bent part 4b of the upper panel 3 and the extension panel 5.

Further, in an exemplary embodiment of the present disclosure, the clamp finger 377 is rotated through the fourth clamp cylinder 378, and the extension panel 5 is pressed and clamped through the clamping finger 377.

Further, in an exemplary embodiment of the present disclosure, the clamp plate 571 is rotated through the fifth clamp cylinder 573, and the lower panel 7 is pressed and clamped with the flat area through the clamp plate 571.

Next, in an exemplary embodiment of the present disclosure, the upper panel 3 and the extension panel 5 that are aligned and fixed to the first activation frame 330 are firstly welded with the laser brazing through the brazing assembly (not shown in the drawing).

In this process, in the state in which the first activation frame 330 is tilting-rotated in the direction away from the second activation frame 530, the brazing assembly is moved along the clamping line CL of the third clamping blocks 375 through a robot, and the overlapping part of the upper panel 3 and the extension panel 5 undergo the laser brazing through the brazing assembly.

As described above, in the state in which the primary laser brazing of the upper panel 3 and the extension panel 5 is completed, in an exemplary embodiment of the present disclosure, the third clamping block 375 is rotated through the third clamp cylinder 376, and the clamping for the overlap part of the bent part 4b of the upper panel 3 and the extension panel 5 is released. Simultaneously, in an exemplary embodiment of the present disclosure, the clamp finger 377 is rotated through the fourth clamp cylinder 378, and the clamping of the extension panel 5 is released.

In this state, in the exemplary embodiment of the present disclosure, the first activation frame 330 is tilting-rotated in the direction approaching the second activation frame 530 by the forward actuation of the first driving cylinder 333.

Then, in an exemplary embodiment of the present disclosure, the locking block 615 is rotated toward the first activation frame 330 side by the forward actuation of the locking cylinder 611, the locking block 615 is locked with the docking block 617 of the first activation frame 330, and the first activation frame 330 is fixed to the fixing frame 531.

Next, in an exemplary embodiment of the present disclosure, the second activation cylinder 533 is linearly moved in the direction approaching the first activation frame 330 by the forward actuation of the second activation cylinder 533, and the lower panel 7 is pressed to the second side edge of the extension panel 5. The second side edge of the extension panel 5 and the lower panel 7 are then kept in contact with each other.

In this state, in an exemplary embodiment of the present disclosure, the extension panel 5 and the lower panel 7 are secondarily laser-brazed for the welding through the brazing assembly (not shown in the drawing).

In this process, between the first activation frame 330 and the second activation frame 530, the brazing assembly is moved along the length direction of the extension panel 5 through the robot, and the contact part of the extension panel 5 and the lower panel 7 is laser-brazed for the welding through the brazing assembly.

As described above, in the state in which the secondary laser brazing of the extension panel 5 and the lower panel 7 is completed, in an exemplary embodiment of the present disclosure, the third alignment locator 553 is moved backward through the first locator cylinder 554 in the lower direction and the alignment for the edge bent part of the lower panel 7 is released.

Also, in an exemplary embodiment of the present disclosure, the fourth alignment locator 555 is moved backward in the downward direction through the second locator cylinder 556, and the alignment for both end bent parts of the lower panel 7 is released.

In an exemplary embodiment of the present disclosure, the clamp plate 571 is rotated through the fifth clamp cylinder 573 and the clamping of the lower panel 7 is released.

At the same time, in an exemplary embodiment of the present disclosure, the position determining pin 361 is moved in the downward direction from the reference hole 5a of the extension panel 5 by the backward actuation of the pin cylinder 363, and the alignment of the extension panel 5 is released.

In an exemplary embodiment of the present disclosure, the first clamping block 371 is rotated through the first clamp cylinder 372, and the clamping for the flat part 4a of the upper panel 3 is released.

Also, in an exemplary embodiment of the present disclosure, the second clamping block 373 is rotated through the second clamp cylinder 374, and the clamping for the bent part 4b of the upper panel 3 is released.

Next, in an exemplary embodiment of the present disclosure, the second activation frame 533 is linearly moved in the direction away from the first activation frame 330 by the backward actuation of the second driving cylinder 533.

Thus, in an exemplary embodiment of the present disclosure, the fixing state of the upper panel 3, the extension panel 5, and the lower panel 7 for the first and second activation frames 330 and 530 is released.

Next, in an exemplary embodiment of the present disclosure, the locking block 615 is unlocked from the docking block 617 by the backward activation of the locking cylinder 611, and the first activation frame 330 is tilting-rotated in the direction away from the second activation frame 530 by the backward activation of the first driving cylinder 333.

Further, in an exemplary embodiment of the present disclosure, if the assembly in which the upper panel 3, the extension panel 5, and the lower panel 7 are laser-brazed for the welding is purged from the first activation frame 330, assembly of the trunk lid 1 is completed.

According to the trunk lid assembling jig apparatus 100 according to an exemplary embodiment of the present disclosure as described above, the alignment/fixing of the upper panel 3, the extension panel 5, and the lower panel 7, the primary laser brazing of the upper panel 3 and the extension panel 5, and the secondary laser brazing of the lower panel 7 and the extension panel 5 may be obtained in the single process.

Thus, in an exemplary embodiment of the present disclosure, since the upper panel 3, the extension panel 5, and the lower panel 7 may be aligned and double pressed in the single process jig and the laser brazing of these panels may be performed, the entire assembly process of the trunk lid 1 may be simplified, an assembly work time may be reduced, and a capital investment cost may be reduced.

Also, in an exemplary embodiment of the present disclosure, since a handling process according to the loading and unloading of the assemble panels may be minimized, it is possible to prevent a deterioration in assembling quality of the trunk lid 1 due to assembly dispersion of the panels.

While this disclosure has been described in connection with what is while this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A jig apparatus for assembling a vehicle trunk lid including an upper panel, an extension panel, and a lower panel, comprising:
   a jig frame;
   a first activation jig unit configured to align and fix the upper panel and the extension panel and installed at the jig frame in front and rear directions to be tilting-rotatable; and
   a second activation jig unit configured to align and fix the lower panel and installed at the jig frame to be linearly movable in the front and rear directions with respect to the first activation jig unit.

2. The jig apparatus for assembling the trunk lid of claim 1, wherein:
   the first activation jig unit aligns and fixes the upper panel and the extension panel so that a lower end edge of the upper panel and a first side edge of the extension panel are mutually overlapped,
   in a state in which the first activation jig unit is tilting-rotated in a direction away from the second activation jig unit, the upper panel and the extension panel are aligned and fixed.

3. The jig apparatus for assembling the trunk lid of claim 1, wherein:
   the second activation jig unit aligns and fixes the lower panel so that the lower panel faces a second side edge of the extension panel, and
   in a state in which the first activation jig unit is tilting-rotated in a direction approaching the second activation jig unit,
   the second activation jig unit is linearly moved a first activation jig unit side and presses the lower panel to the second side edge of the extension panel.

4. The jig apparatus for assembling the trunk lid of claim 1, wherein:
   in the first activation jig unit, primary laser brazing is performed for an overlapping part of the upper panel and the extension panel through a brazing assembly, and
   secondary laser brazing is performed between the first and second activation jig units through the brazing assembly for a facing part of the lower panel and the extension panel.

5. A jig apparatus for assembling an upper panel, an extension panel, and a lower panel of a vehicle trunk lid by laser brazing, comprising:
   a jig frame;

a first activation frame having a first jig base supporting the upper panel and the extension panel and installed at the jig frame in front and rear directions to be tilting-rotatable;

a second activation frame having a second jig base supporting the lower panel and installed corresponding to the first activation frame at the jig frame to be linearly movable in the front and rear directions;

a plurality of aligning units respectively installed at the first and second activation frames, aligning the upper panel and the extension panel in a predetermined position of the first jig base, and aligning the lower panel in a predetermined position of the second jig base; and a plurality of clampers respectively installed at the first and second activation frames, fixing the upper panel and the extension panel at the first jig base, and fixing the lower panel at the second jig base.

6. The jig apparatus for assembling the trunk lid of claim 5, wherein:

a first driving cylinder is installed at both of right and left sides of the jig frame to be connected to the first activation frame and tilting-rotating the first activation frame in the front and rear directions.

7. The jig apparatus for assembling the trunk lid of claim 6, wherein:

the first activation frame is coupled to the jig frame through a tilting rotation axis to be tilting-rotatable, and the first driving cylinder is connected to both ends of the tilting rotation axis through a rotation bracket and applies a forward/backward activation force in front and rear directions to a rotation bracket through an actuating rod.

8. The jig apparatus for assembling the trunk lid of claim 5, wherein:

the second activation frame is installed in the fixing frame on the jig frame to be movable back and forth in the front and rear directions through a guide rail, and a second driving cylinder connected to the second activation frame and applying a forward/backward activation force to the second activation frame in the front and rear directions is installed at both of right and left sides of, fixing frame.

9. The jig apparatus for assembling the trunk lid of claim 5, further comprising:

a locking unit installed fixing frame and selectively locking the first activation frame to the fixing frame, wherein the locking unit is hinge-coupled to a locking cylinder installed at the fixing frame and an actuating rod tip of the locking cylinder and includes a locking block installed at the fixing frame to be rotatable.

10. The jig apparatus for assembling the trunk lid of claim 9, wherein a docking block through which locking and unlocking is selectively performed with the locking block is installed at the first activation frame.

11. The jig apparatus for assembling the trunk lid of claim 5, wherein the aligning units include:

a first aligning unit installed at the first activation frame and aligned so that a lower end edge of the upper panel overlaps a first side edge of the extension panel; and a second aligning unit installed at the second activation frame and aligned so that the lower panel faces a second side edge of the extension panel.

12. The jig apparatus for assembling the trunk lid of claim 11, wherein the dampers include:

a first damper installed at the first activation frame and respectively clamping the upper panel and the extension panel; and a second damper installed at the second activation frame and clamping the lower panel.

13. The jig apparatus for assembling the trunk lid of claim 12, wherein the first damper includes:

a plurality of first clamping blocks installed at the first activation frame to be rotatable by a first clamp cylinder and pressing a flat part of the upper panel;

a plurality of second clamping blocks installed to be rotatable at the first activation frame by a second clamp cylinder and pressing a bent part of the upper panel; and a plurality of third clamping blocks installed to be rotatable by a third clamp cylinder at the first activation frame and pressing an overlapping part of the bent part of the upper panel and the extension panel.

14. The jig apparatus for assembling the trunk lid of claim 13, wherein:

the third clamping blocks form a clamping line connected in a streamlined shape along the overlapping part of the bent part of the upper panel and the extension panel.

15. The jig apparatus for assembling the trunk lid of claim 13, wherein the first damper further includes:

at least one clamp finger installed at the first activation frame to be rotatable by a fourth clamp cylinder, rotating in the front and rear directions through the first jig base, and pressing the extension panel.

16. The jig apparatus for assembling the trunk lid of claim 15, wherein:

the second damper includes a plurality of clamp plates installed at the second activation frame to be rotatable by a fifth clamp cylinder and pressing the upper panel in a plan view.

17. The jig apparatus for assembling the trunk lid of claim 11, wherein the first aligning unit includes:

a plurality of first alignment locators installed at the first activation frame and supporting a flat part of the upper panel; and at least one position determining pin installed at the first activation frame, installed to be movable in up and down directions through the first jig base by a pin cylinder, and inserted into a reference hole provided in the extension panel.

18. The jig apparatus for assembling the trunk lid of claim 11, wherein the second aligning unit includes:

a plurality of second alignment locators installed at the second activation frame and supporting a flat part of the lower panel; and at least one third alignment locator installed at the second activation frame to be movable by a first locator cylinder in the up and down directions and supporting an edge bent part of the lower panel.

19. The jig apparatus for assembling the trunk lid of claim 18, wherein the second aligning unit further includes:

a fourth alignment locator disposed corresponding to the second jig base at the second activation frame to be inclined toward the first activation frame, installed to be movable by a second locator cylinder in the up and down directions, and supporting both end bent parts of the lower panel.

20. The jig apparatus for assembling the trunk lid of claim 19, wherein the fourth alignment locator includes:

a first locator block forming a same flat surface as both end parts of the second jig base; and a second locator block connected to the first locator block and forming an end step for supporting both end bent parts of the lower panel.

\* \* \* \* \*